US008510488B2

(12) United States Patent
Namba

(10) Patent No.: US 8,510,488 B2
(45) Date of Patent: Aug. 13, 2013

(54) FUNCTION CONTROL APPARATUS AND FUNCTION CONTROL METHOD

(75) Inventor: Mutsumi Namba, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 373 days.

(21) Appl. No.: 12/219,902

(22) Filed: Jul. 30, 2008

(65) Prior Publication Data

US 2009/0043924 A1 Feb. 12, 2009

(30) Foreign Application Priority Data

Aug. 8, 2007 (JP) ................................. 2007-206784
Jun. 17, 2008 (JP) ................................. 2008-158302

(51) Int. Cl.
| G06F 3/00 | (2006.01) |
| G06F 13/12 | (2006.01) |
| G06F 13/00 | (2006.01) |
| G06F 3/12 | (2006.01) |
| G06F 15/00 | (2006.01) |
| H04N 1/32 | (2006.01) |

(52) U.S. Cl.
USPC .......... 710/104; 710/2; 710/5; 710/8; 710/62; 358/1.9; 358/1.13; 358/1.15; 358/468; 712/209; 712/229

(58) Field of Classification Search
USPC .......... 710/2, 5, 8, 52, 62, 104, 316; 358/1.9, 358/1.13, 1.14, 1.15, 468; 712/208–209, 712/229, 248
See application file for complete search history.

(56) References Cited

U.S. PATENT DOCUMENTS

| 5,724,555 | A | * | 3/1998 | Wadsworth .................... 358/468 |
| 6,763,202 | B2 | * | 7/2004 | Maeda ............................ 399/53 |
| 6,795,887 | B1 | * | 9/2004 | Cervantes ..................... 710/316 |
| 6,880,074 | B2 | * | 4/2005 | Perry et al. ..................... 712/248 |
| 6,885,469 | B1 | * | 4/2005 | Tanimoto ..................... 358/1.14 |
| 6,907,480 | B2 | * | 6/2005 | Takei et al. ..................... 710/52 |
| 6,917,991 | B2 | | 7/2005 | Namba |
| 6,965,984 | B2 | * | 11/2005 | Seal et al. ..................... 712/209 |
| 7,191,314 | B2 | * | 3/2007 | Pappalardo et al. ......... 712/208 |
| 7,536,534 | B2 | * | 5/2009 | Nakajima ..................... 712/209 |
| 7,539,801 | B2 | * | 5/2009 | Xie et al. ...................... 710/104 |
| 7,623,258 | B2 | * | 11/2009 | Kajiwara et al. ............. 358/1.15 |
| 7,673,303 | B2 | * | 3/2010 | Sadovsky et al. ............. 718/101 |

(Continued)

FOREIGN PATENT DOCUMENTS

| JP | 2000-010912 | 1/2000 |
| JP | 2002-178608 | 6/2002 |
| JP | 2002178608 | A * 6/2002 |
| JP | 2006-229514 | 8/2006 |

OTHER PUBLICATIONS

Japanese Office Action mailed Jul. 14, 2009.

*Primary Examiner* — Idriss N Alrobaye
*Assistant Examiner* — Henry Yu
(74) *Attorney, Agent, or Firm* — Harness, Dickey & Pierce P.L.C.

(57) ABSTRACT

A transmission control unit transmits function specifying information for specifying a function to be executed. A function control unit executes a first function specified by the function specifying information. A connecting unit, when an additional function control unit that executes a second function specified according to the function specifying information is connected between the transmission control unit and the function control unit, transmits the function specifying information to the additional function control unit, and when it is disconnected, transmits the function specifying information to the function control unit.

18 Claims, 11 Drawing Sheets

(56) References Cited

U.S. PATENT DOCUMENTS

| | | | |
|---|---|---|---|
| 2002/0103992 A1* | 8/2002 | Perry et al. .................... | 712/229 |
| 2002/0188825 A1* | 12/2002 | Seal et al. ..................... | 712/209 |
| 2003/0197886 A1* | 10/2003 | Fujinaga et al. ............. | 358/1.14 |
| 2004/0133770 A1* | 7/2004 | Pappalardo et al. .......... | 712/248 |
| 2004/0233467 A1* | 11/2004 | Namizuka .................... | 358/1.13 |
| 2006/0089819 A1* | 4/2006 | Dubal ........................... | 702/183 |
| 2006/0147235 A1* | 7/2006 | Sadovsky et al. ............. | 400/62 |
| 2006/0149921 A1* | 7/2006 | Lim ............................... | 712/10 |
| 2007/0171449 A1* | 7/2007 | Tanno et al. .................. | 358/1.13 |
| 2007/0206211 A1* | 9/2007 | Okutsu et al. ................ | 358/1.14 |

* cited by examiner

FIG. 4

| BIT | 4 | 3 | 2 | 1 | 0 |
|---|---|---|---|---|---|
| FUNCTION | MISSING NUMBER | FIRST SCANNER-IMAGE PRE-PROCESSING UNIT | FIRST SCANNER-IMAGE POST-PROCESSING UNIT | FIRST IMAGE ROTATOR | MISSING NUMBER |
| FUNCTION SELECTION MODE VALUE | 0 | 1 | 1 | 1 | 0 |
| | 1 | 0 | 1 | 0 | 0 | 0 |

| BIT | 4 | 3 | 2 | 1 | 0 |
|---|---|---|---|---|---|
| FUNCTION | IMAGE COM-PRESSOR | MISSING NUMBER | SECOND SCANNER-IMAGE POST-PROCESSING UNIT | SECOND IMAGE ROTATOR | HARD DISK CON-TROLLER |
| TABLE SETTING VALUE 0 | 1 | 0 | 1 | 1 | 1 |
| TABLE SETTING VALUE 1 | 1 | 0 | 1 | 1 | 0 |

FIG. 12

| IMAGE ROTATOR FUNCTION ID REGISTER | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| | ID ||||||||||||||||  REVISION |||||||| INSTANCE ||||||||
| ADDRESS 0×0.7000 | READONLY |||||||||||||||| READONLY |||||||| READONLY ||||||||
| DEFAULT | 0 | 1 | 0 | 1 | 0 | 0 | 1 | 0 | 0 | 1 | 0 | 1 | 0 | 0 | 1 | 0 | 0 | 0 | 0 | 0 | 0 | 0 | 0 | 1 | 0 | 0 | 0 | 0 | 0 | 0 | 0 | 1 |

BIT 31-16: ID FUNCTION ID OF IMAGE ROTATOR CAN BE READ OUT
ASCII CODE OF IMAGE ROTATOR (RR) IS 0×52(R), 0×52(R)

BIT 15-08: REVISION VERSION INFORMATION CAN BE READ OUT

BIT 07-00: INSTANCE INDICATING INSTANCE NUMBERS OF INSTANCED PLURAL SAME FUNCTIONS

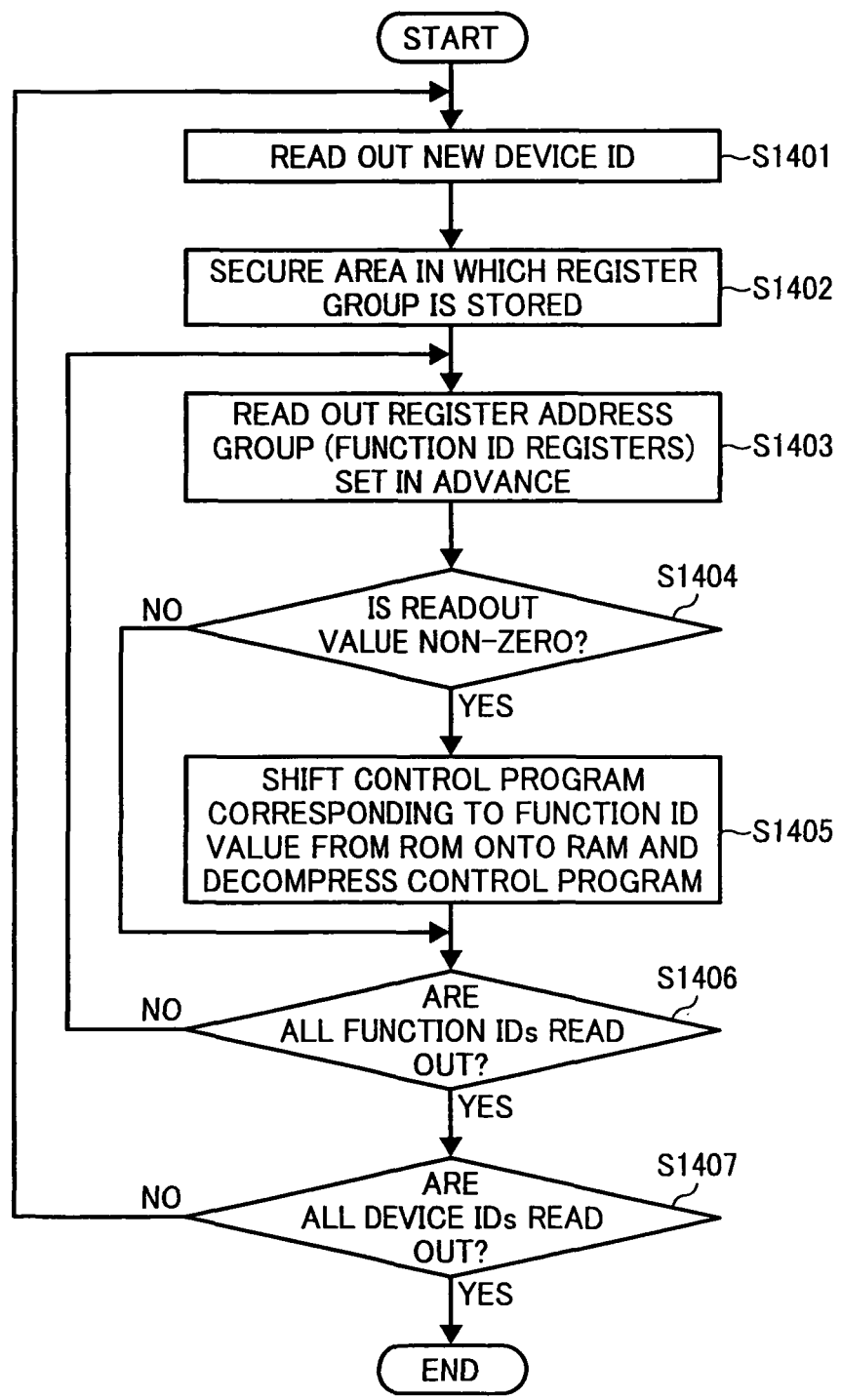

FUNCTION CONTROL APPARATUS AND FUNCTION CONTROL METHOD

CROSS-REFERENCE TO RELATED APPLICATIONS

The present application claims priority to and incorporates by reference the entire contents of Japanese priority document 2007-206784 filed in Japan on Aug. 8, 2007 and Japanese priority document 2008-158302 filed in Japan on Jun. 17, 2008.

BACKGROUND OF THE INVENTION

1. Field of the Invention

The present invention relates to a function control apparatus and a function control method for controlling functions.

2. Description of the Related Art

Recently, digital multifunction products including a combination of a plurality of functions such as a printer function, a copying machine function, and a facsimile function are spread. Because the digital multifunction products are used by users in a variety of occasions, it is desired to extend necessary functions according to user needs based on inexpensive apparatuses having only basic functions. For example, in a basic copying machine, capacities for storage of copy documents and rearrangement of pages are limited. However, it is possible to substantially increase the capacities through hard disk extension according to demands of users.

On the other hand, extended devices employing an interface standard such as a peripheral component interconnect (PCI) and a universal serial bus (USB) are widespread because functions can be easily added simply by connecting the extended devices to a bus and a switch device. As a technology for such extended devices, for example, the technology disclosed in Japanese Patent Application Laid-open No. 2000-10912 is publicly known. An object of the technology is to provide a low-cost and highly scalable PCI adapter card that can make use of a large-scale integration (LSI) and a chip set incorporating PCI interfaces. In the technology, a host card having a first function block including a PCI-to-PCI bridge, a PCI bus, and a PCI bus interface and a module card having a second function block including a PCI bus and a PCI bus interface are connected to each other by a connector to form a multifunction adapter card. The multifunction adapter card and a PC motherboard having a first PCI bus are connected by a PCI edge connector and a PCI slot.

In the technology disclosed in Japanese Patent Application Laid-open No. 2000-10912, extension of functions of an apparatus is performed by a PCI extension card. However, functions before and after the extension are independent from one another. Therefore, direct cooperation of the functions before and after the extension is difficult. For example, it is difficult to perform image processing with the function before the extension and compress and encode an image, which is obtained by the image processing, with the extended function.

SUMMARY OF THE INVENTION

It is an object of the present invention to at least partially solve the problems in the conventional technology.

According to an aspect of the present invention, there is provided a function control apparatus including a transmission control unit that transmits function specifying information for specifying a function to be executed; a function control unit that executes a first function specified by the function specifying information; an additional function control unit that executes a second function specified according to the function specifying information, the additional function control unit being configured to be connected and disconnected between the transmission control unit and the function control unit; and a connecting unit that, when the additional function control unit is connected, transmits the function specifying information to the additional function control unit, and when the additional function control unit is disconnected, transmits the function specifying information to the function control unit.

Furthermore, according to another aspect of the present invention, there is provided a function control method including transmitting including a transmission control unit transmitting function specifying information for specifying a function to be executed; executing including a function control unit executing a first function specified by the function specifying information; executing including an additional function control unit executing a second function specified according to the function specifying information, the additional function control unit being configured to be connected and disconnected between the transmission control unit and the function control unit; and connecting including transmitting, when the additional function control unit is connected, the function specifying information to the additional function control unit, and transmitting, when the additional function control unit is disconnected, the function specifying information to the function control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of the structure of a function association table in the scanner control LSI;

FIG. 12 is a diagram of an address and an ID of a function ID register of an image rotator and written contents of Revision and Instance;

FIG. 14 is a flowchart of a processing procedure for detecting a function and loading a software module corresponding to the function in the multifunction product according to this embodiment.

DETAILED DESCRIPTION OF THE PREFERRED EMBODIMENTS

Exemplary embodiments of the present invention are explained in detail below with reference to the accompanying drawings. In the embodiments, a function control apparatus and a function control method according to the present invention are applied to a digital multifunction product, in particular, a digital multifunction product having a copying function (hereinafter, "copying machine"). The embodiments do not limit the function control apparatus and the function control method to the copying machine. The embodiments can be applied to various function control apparatuses and function control methods such as a personal computer (PC) and office equipment.

Figure 1:
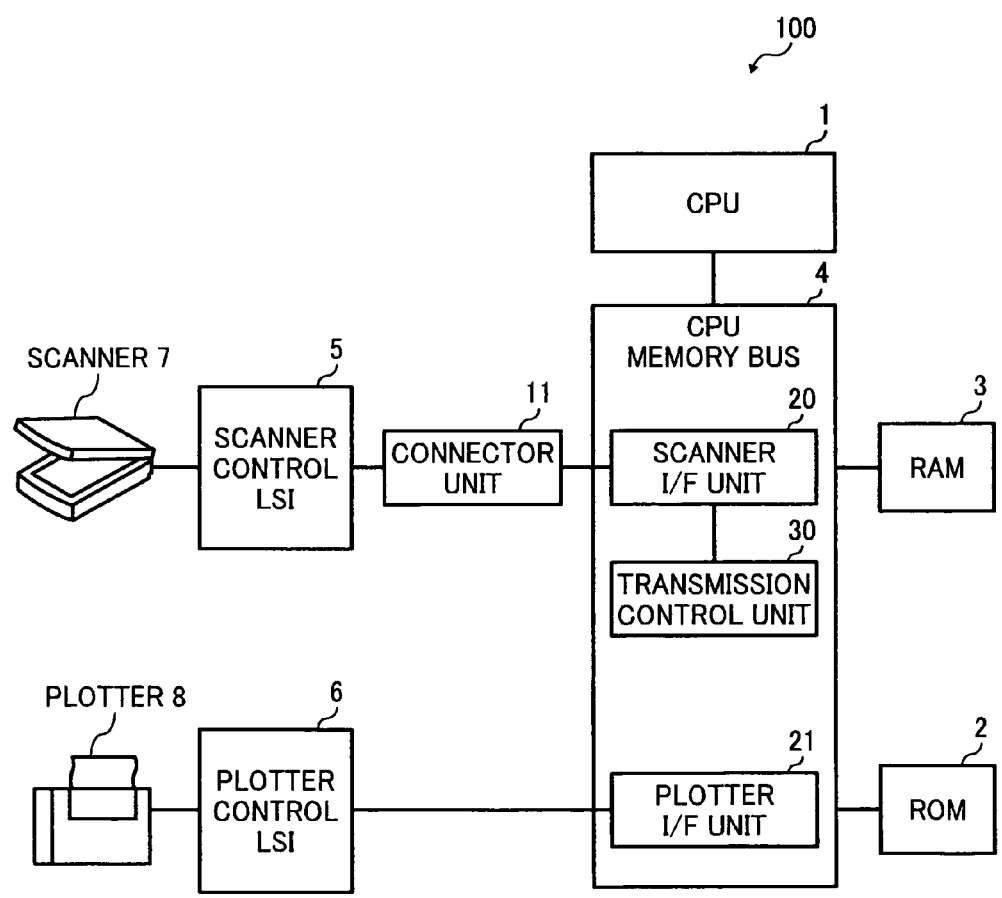
FIG. 1 is a block diagram of a basic configuration of a multifunction product according to an embodiment of the present invention.
Figure 2:
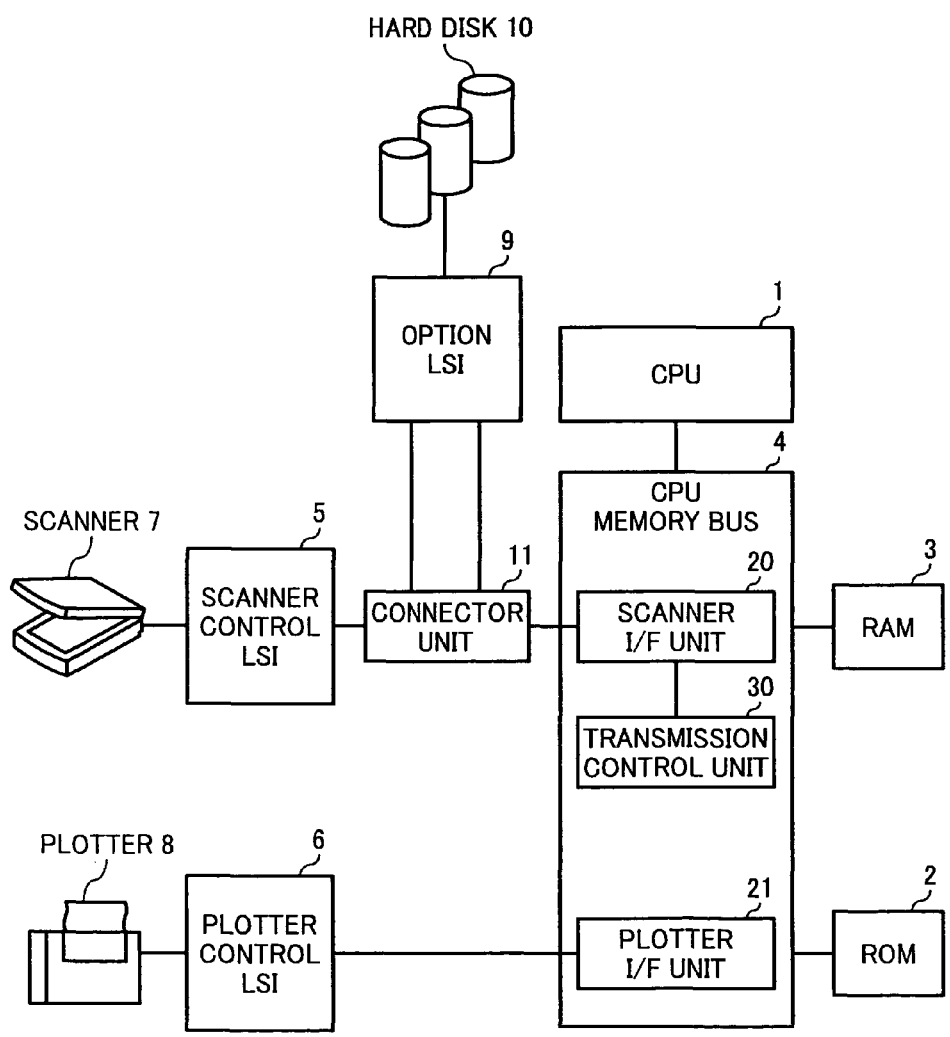
FIG. 2 is a block diagram of a configuration in which functions are extended by mounting, as an option, an option LSI on the multifunction product according to the embodiment.

FIGS. 1 and 2 are diagrams of a configuration of a copying machine according to an embodiment of the present invention. FIG. 1 is a diagram of a basic configuration of the copying machine. FIG. 2 is a diagram of a configuration in which functions are extended by adding an option to the basic configuration shown in FIG. 1.

In FIG. 1, a copying machine 100 includes a central processing unit (CPU) 1 as a main body control unit, a read only memory (ROM) 2, a random access memory (RAM) 3, a CPU memory bus 4, a scanner control LSI 5, a connector unit 11, and a plotter control LSI 6. The copying machine 100 is connected to a scanner 7 via the scanner control LSI 5 and connected to a plotter 8 via the plotter control LSI 6 and carries out a copying function.

The CPU 1 controls respective units of the copying machine 100 and collectively controls the entire copying machine 100.

Program codes are stored in the ROM 2. The CPU 1 reads out the program codes and expands the program codes to the RAM 3. The CPU 1 executes control according to expanded programs.

The programs stored in the ROM 2 include a scanner program for controlling the scanner control LSI 5 and a plotter control program for controlling the plotter control LSI 6. The scanner control program allows a user to use all functions provided by the scanner control LSI 5. Assuming that the plotter control program provides functions in the same manner, explanation of the plotter control program is omitted.

As shown in FIG. 2, when an option LSI 9 is connected to the connector unit 11, an option control program for controlling the option LSI 9 is added as a program stored in the ROM 2.

The CPU memory bus 4 connects the CPU 1 to the ROM 2 and the RAM 3 and connects the scanner control LSI 5 and the man body control unit via the connector unit 11. The CPU memory bus 4 also connects the plotter control LSI 6 and the main body control unit. In this way, the CPU memory bus 4 allows the CPU 1 to control an entire system of the copying machine 100.

The CPU memory bus 4 also includes a scanner I/F unit 20, a plotter I/F unit 21, and a transmission control unit 30 on a not-shown board for controlling the CPU memory bus 4. The scanner I/F unit 20 can be connected to the scanner control LSI 5 and the option LSI 9 via the connector unit 11. When the option LSI 9 is not connected as shown in FIG. 1, the scanner I/F unit 20 is an interface that can communicate with the scanner control LSI 5. A communication method between the scanner I/F unit 20 and the scanner control LSI 5 can be any method. For example, it is conceivable to communicate through a PCI express.

The transmission control unit 30 is mounted on the board on the CPU memory bus 4 side. The transmission control unit 30 controls transmission of a function selection mode value to an LSI (in FIG. 1, the scanner control LSI 5) with which the transmission control unit 30 can communicate via the scanner I/F unit 20 on the board on the CPU memory bus 4 side.

The function selection mode value is function specifying information for specifying an executable function among the functions of the respective LSIs. When the scanner control LSI 5 receives the function selection mode value, the scanner control LSI 5 specifies an executable function based on a value indicated by the function selection mode value and performs data processing using the function.

When the option LSI 9 is not connected to the connector unit 11, the transmission control unit 30 transmits the function selection mode value to the scanner control LSI 5 via the scanner I/F unit 20. The scanner control LSI 5 specifies, based on the function selection mode value, a function to be executed and performs data processing using the function.

The plotter I/F unit 21 is an interface that can communicate with the plotter control LSI 6. A communication method between the plotter I/F unit 21 and the plotter control LSI 6 can be any method. In this embodiment, the PCI express is used.

The scanner 7 optically scans a reading object such as an original, converts scanned image data into an electric signal, and transmits the electric signal to the scanner control LSI 5. The plotter 8 forms a visible image on a recording medium based on input data from the plotter control LSI 6 side. In this case, the plotter 8 print-outputs the image data, which is scanned by the scanner 7, directly or after applying predetermined processing thereto.

FIG. 2 is an example of extension of the functions in the configuration shown in FIG. 1. The option LSI 9 is connected between the scanner control LSI 5 and the CPU memory bus 4 by using the connector unit 11 to extend the functions. In this example, a hard disk drive (HDD) 10 is connected at a post stage of the option LSI 9 to add a function of accumulating image data scanned by the scanner 7. It is possible to add a function not included in basic functions and execute the function. For example, it is possible to compress the image data after scanner image processing or perform image processing with a higher added value using the function of the option.

The option LSI 9 can provide a function of performing processing already executable by the scanner control LSI 5. Even when the option LSI 9 has a function of performing processing executable by the scanner control LSI 5, if the processing can be performed at higher quality and higher processing speed by the function than the function provided by the scanner control LSI 5, function improvement can be realized when the option LSI 9 is connected. The function selection mode value is used for switching the functions mounted on the respective LSIs.

Figure 3:
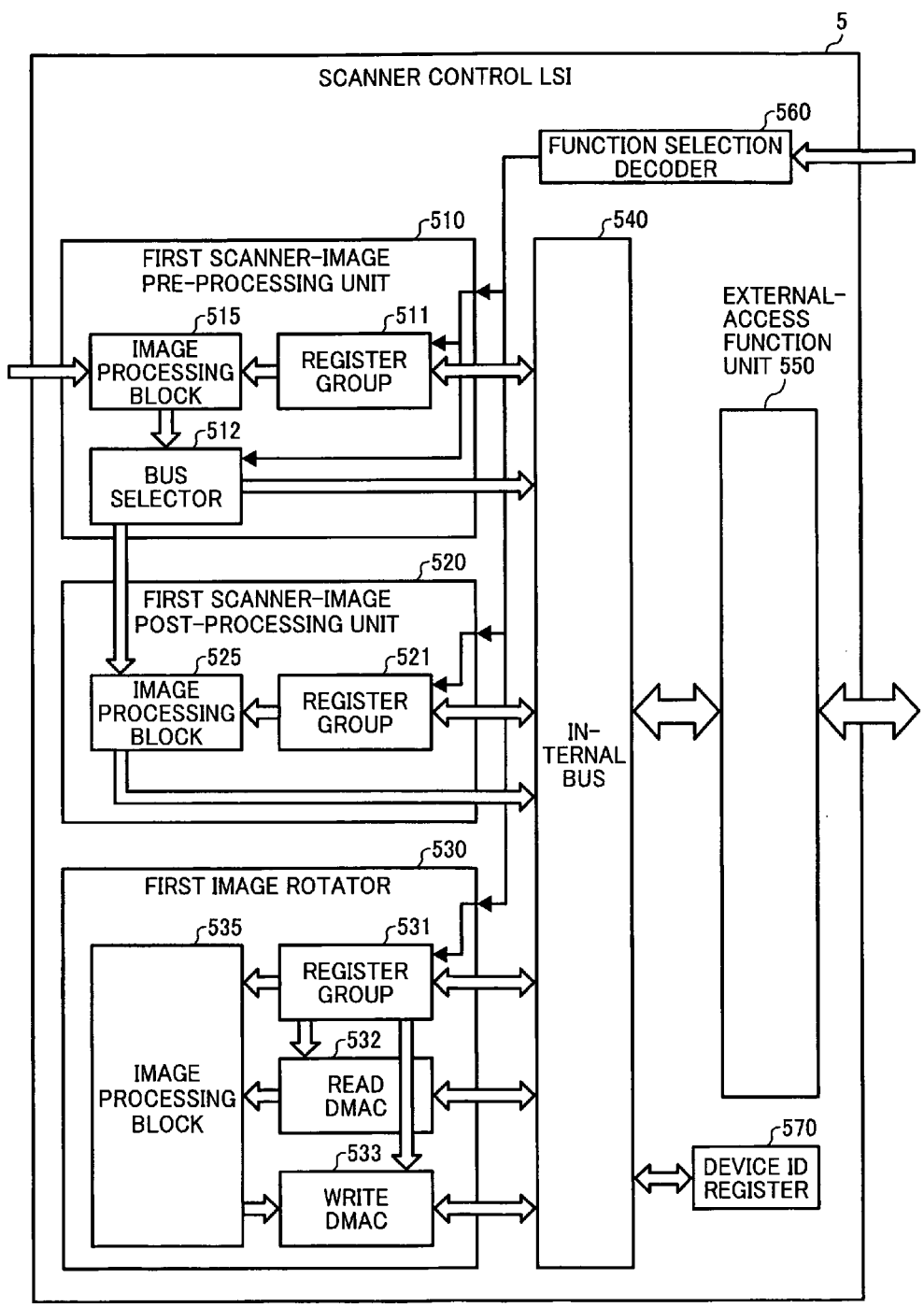
FIG. 3 is a block diagram of an internal configuration of a scanner control LSI as an extended device.

FIG. 3 is a block diagram of an internal configuration of the scanner control LSI 5. As shown in the figure, the scanner control LSI 5 includes three function blocks: a first scanner-image pre-processing unit 510, a first scanner-image post-processing unit 520, and a first image rotator 530. The function blocks include register groups 511, 521, and 531, respectively. The scanner control LSI 5 includes an internal bus 540, an external-access function unit 550, a function selection decoder 560, and a device ID register 570. The internal bus 540 is connected to the first scanner-image pre-processing unit 510, the first scanner-image post-processing unit 520, and the first image rotator 530 and is further connected to a control block at a post stage via the external-access function unit 550.

The function selection decoder 560 stores a function correspondence table on a not-shown register. The function selection decoder 560 decodes, referring to the function correspondence table, a function selection mode value input to the scanner control LSI 5 from the outside and distributes operation permission signals to the respective function blocks. According to the operation permission signals, the function selection decoder 560 can specify whether the respective functions are executable. In other words, the function selection decoder 560 plays a function of a specifying unit for specifying an executable function.

When the copying machine 100 has the basic configuration, all the functions of the scanner control LSI 5 are activated by the operation permission signals. The device ID register 570 is connected to the internal bus 540 and stores an ID for identifying the scanner control LSI 5 to which the device ID register 570 belongs (hereinafter, "device ID"). The device ID is transmitted from the internal bus 540 to the CPU 1 when necessary.

In this embodiment, the basic configuration indicates a configuration in which the option LSI 9 is not connected to the connector unit 11. A configuration in which the option LSI 9 is connected to the connector unit 11 is referred to as an option configuration.

The first scanner-image pre-processing unit 510 includes an image processing block 515, the register group 511, and a bus selector 512. Scanned data from the scanner 7 is input to the image processing block 515. The image processing block 515 applies pre-processing to the scanned data to generate image data. The bus selector 512 selects a transmission destination of the generated image data from the internal bus 540 and the first scanner-image post-processing unit 520. In other words, the bus selector 512 can select whether scanner image post-processing should be applied to the image data in the scanner control LSI 5.

The first scanner-image post-processing unit 520 includes an image processing block 525 and the register group 521. The first scanner-image post-processing unit 520 applies the scanner image post-processing to the image data input from the first scanner-image pre-processing unit 510 and outputs the image data to the internal bus 540. The first image rotator 530 includes an image processing block 535, a register group 531, a read DMAC 532, and a write DMAC 533.

In the copying machine 100 including the scanner control LSI 5 in the basic configuration shown in FIG. 1, a processing result of the first scanner-image pre-processing unit 510 is input to the first scanner-image post-processing unit 520. After the first scanner-image post-processing unit 520 applies post-processing to the input image data, a processing result is output to the outside of the scanner control LSI 5 via the internal bus 540 and the external-access function unit 550. In the case of the basic configuration, the output data is written in the RAM 3 via the CPU memory bus 4.

The first image rotator 530 includes the DMA controllers 532 and 533 as described above. The first image rotator 530 applies rotation processing at a predetermined angle to the image data read out from the RAM 3 by the read DMAC 532 via the internal bus 540 and the external-access function unit 550. Thereafter, the first image rotator 530 writes the image data subjected to the rotation processing in the RAM 3 again using the write DMAC 533 via the internal bus 540 and the external-access function unit 550.

As described above, the function selection decoder 560 decodes the function selection mode value input to the scanner control LSI 5 from the outside and distributes the operation permission signals to the respective function blocks. When the copying machine 100 has the basic configuration, all the functions are activated by the operation permission signals.

The operation permission signals are signals for identifying whether execution of processing by the respective function blocks (e.g., the first scanner-image pre-processing unit 510, the first scanner-image post-processing unit 520, and the first image rotator 530) should be permitted. When it is judged that execution of the processing by the respective function blocks is permitted by the operation permission signals, the processing by the function blocks is activated.

FIG. 4 is a diagram of an example of the function correspondence table included in the function selection decoder 560. An example of a relation among functions executable at respective function selection mode values is shown in FIG. 4. When values of the respective functions are '1', this indicates that the functions are active (ON). When the values are '0', this indicates that the functions are inactive (OFF). In the example shown in FIG. 4, bit values are allocated to the respective functions. Types of the functions allocated to the respective bits are commonly used by the scanner control LSI 5 and the option LSI 9. This clarifies a correspondence relation between the functions executed by the option LSI 9 and the functions executed by the scanner control LSI 5. Consequently, a work load on a worker who sets execution and non-execution of the respective functions is reduced.

Among the bits, bits of types of functions not mounted on the LSIs are missing numbers. In the example shown in FIG. 4, a 0th bit and a 4th bit are missing numbers and an active or inactive state can be selected for three functions of 1st to 3rd bits.

In the example shown in FIG. 4, when the function selection mode value is '0', this indicates that all the functions of the first scanner-image pre-processing unit 510, the first scanner-image post-processing unit 520, and the first image rotator 530 allocated to the 1st to 3rd bits are executed. When the function selection mode value is '1', this indicates that only the function of the first scanner-image pre-processing unit 510 allocated to the 1st bit is executed.

Combinations of ON and OFF of the three functions indicated by the 1st to 3rd bits can be represented in eight ways and can be controlled by three function selection signal lines. However, when an actual method of use is taken into account, all the functions do not always have to be turned on and off individually. In this embodiment, it is only selected with one function selection signal line whether all the three functions are activated or only the function of the first scanner-image pre-processing unit 510 is activated.

When a function selection signal is transmitted, single-line serial communication can be used. When the single-line serial communication is used, it is necessary to determine a transfer rate and a transfer size in advance (e.g., 9600 bps and 64 bits). When the transfer rate and the transfer size are determined, a serializer and a deserializer are necessary. When all the functions are selected, it is unnecessary to operate the signal line and the serializer does not have to be provided.

As a modification, the operation permission signals can be transmitted to the respective function blocks by using buses allocated to the function blocks rather than the one signal line. In the modification, the operation permission signals allocated to the respective function blocks are transmitted to the respective function blocks from the buses for the function blocks.

This makes it possible to specifically set an active or inactive state of processing for the respective function blocks (the first scanner-image pre-processing unit 510, the first scanner-image post-processing unit 520, and the first image rotator 530). When the respective function blocks are controlled by the processing, encoding and decoding of the operation permission signals are unnecessary.

Figure 5:
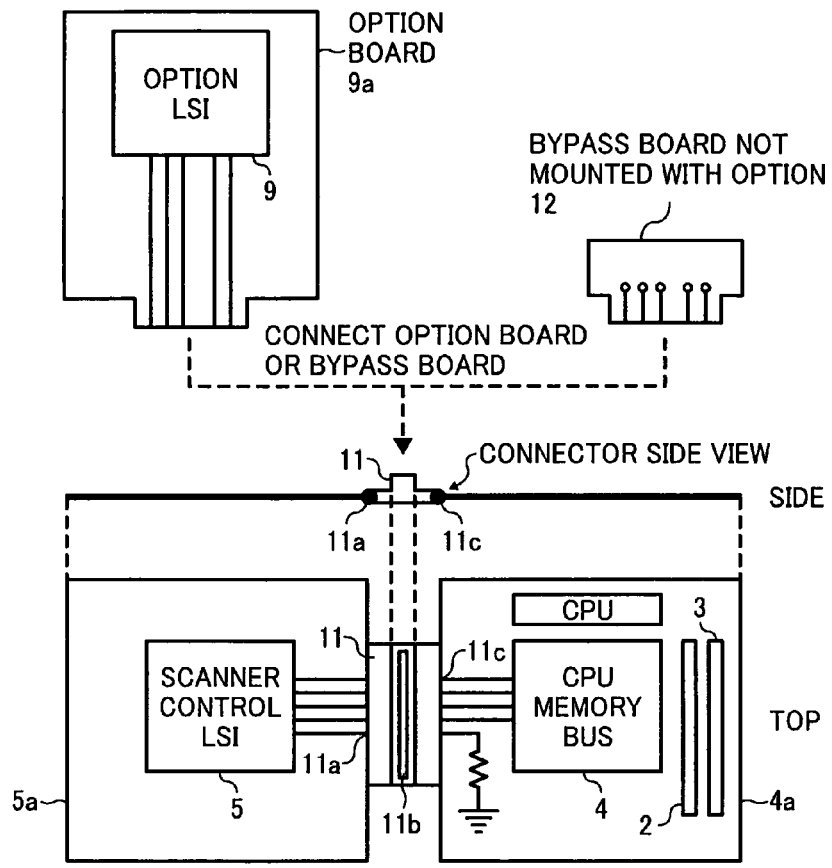
FIG. 5 is a diagram of a physical configuration of the scanner control LSI, a CPU memory bus, and the option LSI connected via a connector unit.

FIG. 5 is a diagram of a physical configuration of the scanner control LSI 5, the CPU memory bus 4, and the option LSI 9. The scanner control LSI 5, the CPU memory bus 4, and the option LSI 9 are mounted on boards 5a, 4a, and 9a, respectively, and can be connected to one another by the connector unit 11.

Figure 6:
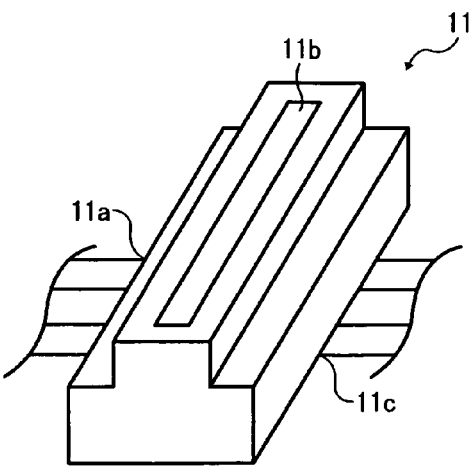
FIG. 6 is a diagram of a hardware shape of the connector unit.

The connector unit 11 has three connection ports (11a, 11b, and 11c). The scanner control LSI 5 and the CPU memory bus 4 are connected via the two connection ports 11a and 11c of the connector unit 11. When the copying machine 100 has the basic configuration, a bypass board 12 is connected to the remaining connection port 11b of the connector unit 11. When the functions are extended, an option board 9a mounted with the option LSI 9 is connected to the connection port 11b. FIG. 6 is a diagram of a hardware shape of the connector unit 11. As shown in FIG. 6, the connection port 11b is an opening to which the option board 9a including the option LSI 9 can be connected.

As shown in FIG. 5, in the connector unit 11, two connection ports (11a and 11c) are provided on the left and right in the horizontal direction in the figure and one connection port (11b) is provided vertically in the center of the left and right ports.

Figure 7:
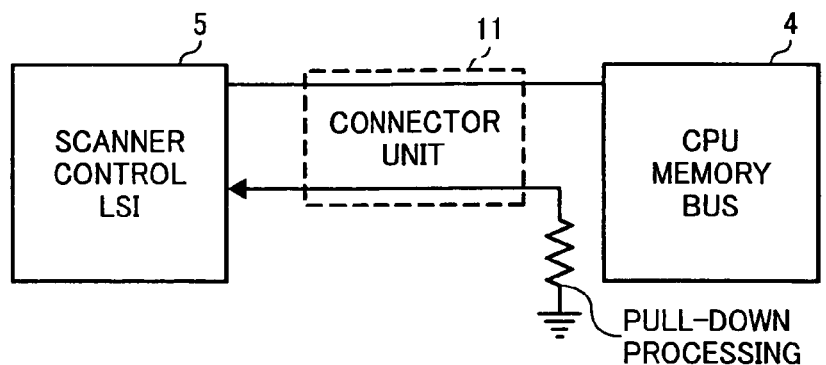
FIG. 7 is a diagram of the scanner control LSI and the CPU memory bus connected via the connector unit by wires on a bypass port.

When the copying machine 100 has the basic configuration, as shown in FIG. 7, data signals of the scanner control LSI 5 and the CPU memory bus 4 are directly connected by wires on the bypass board 12 inserted in the connection port 11b of the connector unit 11. The transmission control unit 30 on the CPU memory bus 4 transmits '0' to the scanner control LSI 5 as the function selection mode value. As shown in FIG. 4, when the function selection mode value is '0', all the functions (the functions of the first scanner-image pre-processing unit 510, the first scanner-image post-processing unit 520, and the first image rotator 530) in the scanner control LSI 5 are activated.

Figure 8:
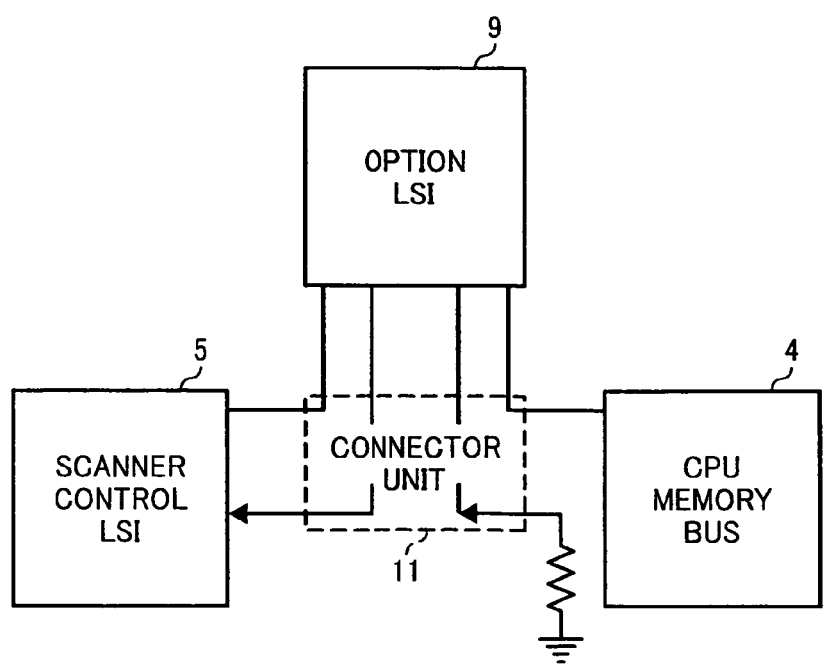
FIG. 8 is a diagram of a configuration of the scanner control LSI, the option LSI, and the CPU memory bus connected via the connector unit by wires on an option board.

When the option board is connected, as shown in FIG. 8, the CPU memory bus 4 and the option LSI 9 are connected and the scanner control LSI 5 and the option LSI 9 are connected by wires on the option board 9a inserted in the connection port 11b of the connector unit 11. Data is transmitted and received through the PCI express between the CPU memory bus 4 and the option LSI 9 and between the scanner control LSI 5 and the option LSI 9. A function selection mode value is output to the scanner control LSI 5, which is connected to the option LSI 9, from the option LSI 9. The function selection mode value output from the option LSI 9 is generated by a function-selection-value generating unit 990 described later. As in this embodiment, the function selection mode value generated by the function-selection-value generating unit 990 is output on condition that the device (the scanner control LSI 5) connected to the option LSI 9 in series can recognize the function selection mode value.

When the option board is connected for the first time, the programs stored in the ROM 2 are updated. Consequently, an option control program for controlling the option LSI 9 is added to the ROM 2.

Functions executed according to the function selection mode value output from the option LSI 9 are limited compared with those executed according to the function selection mode value output from the transmission control unit 30. Consequently, functions executed in the respective LSIs are prevented from overlapping.

In FIG. 5, the option board 9a and the bypass board 12 are formed in a flat shape. Connecting sections provided at lower ends of the boards are inserted into the connector unit 11. However, when the option board 9a is mounted, it is also possible to form the connecting section of the option board 9a and a mounting section of the option LSI 9 to be orthogonal to each other, i.e., in a hook shape to effectively use a space above the connector unit 11 in the figure.

Figure 9:
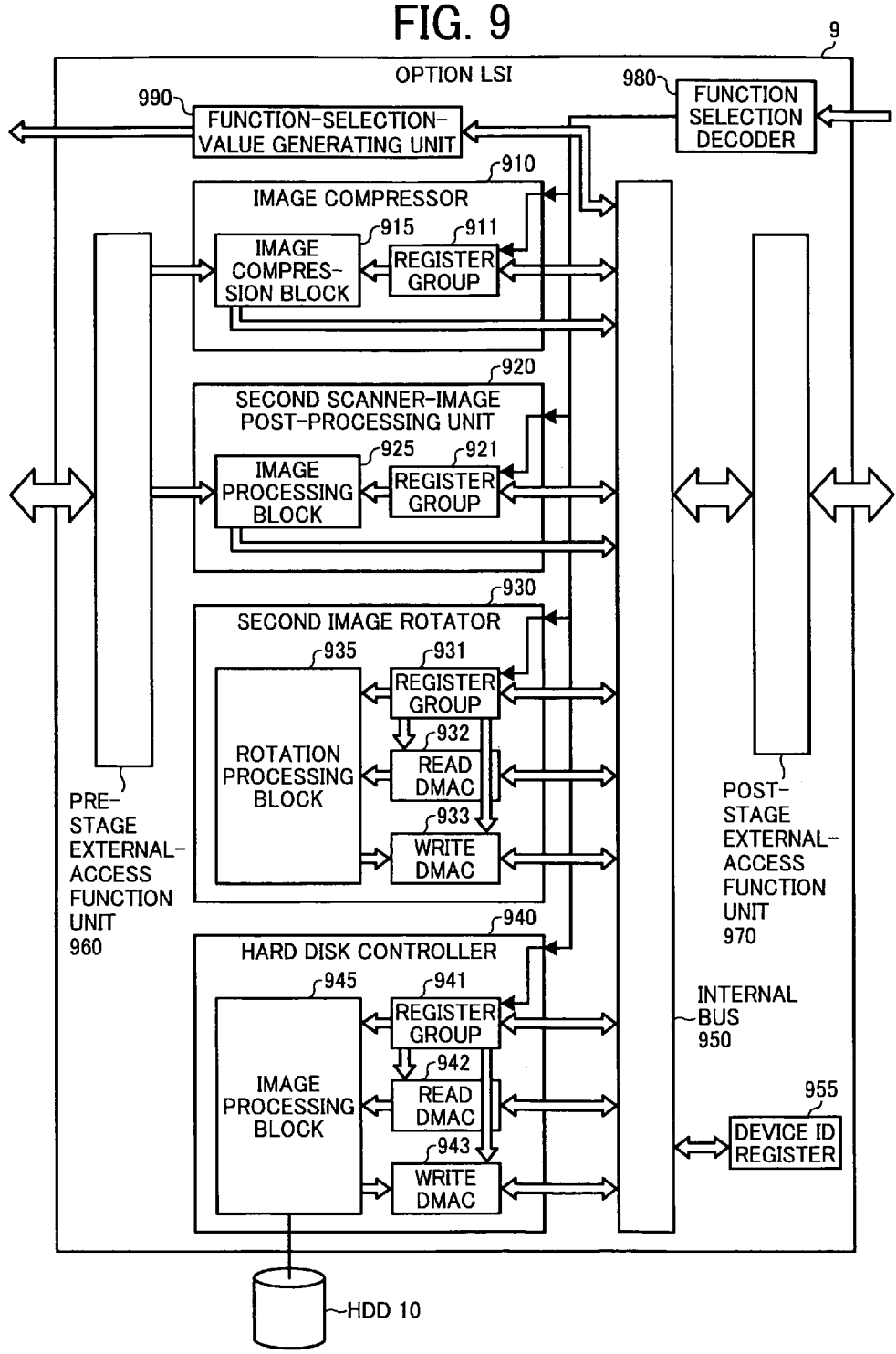
FIG. 9 is a block diagram of an internal configuration of the option LSI.

FIG. 9 is a block diagram of an internal configuration of the option LSI 9. The option LSI 9 includes a plurality of function blocks (an image compressor 910, a second scanner-image post-processing unit 920, a second image rotator 930, and a hard disk controller 940), an internal bus 950, a device ID register 955, a pre-stage external-access function unit 960, a post-stage external-access function unit 970, a function selection decoder 980, and a function-selection-value generating unit (decoder) 990. The option LSI 9 is functionally different from the scanner control LSI 5 in that the option LSI 9 includes the function-selection-value generating unit (decoder) 990 for generating a function selection mode value for another LSI (in this embodiment, the scanner control LSI 5) connected in series at a pre-stage and the pre-stage external-access function unit 960 to which image data from another LSI (in this embodiment, the scanner control LSI 5) connected in series at the pre-stage is input.

In the function blocks shown in FIG. 9, respective kinds of processing such as image compression, scanner image post-processing, image rotation, and memory access to the HDD 10 are performed by the image compressor 910, the second scanner-image post-processing unit 920, the second image rotator 930, and the hard disk controller 940.

The respective function blocks include register groups 911, 921, 931, and 941 and also include an image compression block 915, an image processing block 925, a rotation processing block 935, and an image processing block 945 that realize functions of the respective function blocks. The second image rotator 930 and the hard disk controller 940 include read DMACs 932 and 942 and write DMACs 933 and 943, respectively and can access memories.

The image compression block 915 and the image processing block 925 are connected to the pre-stage external-access function unit 960. The blocks in the function blocks 910, 920, 930, and 940 are connected to the internal bus 950. The post-stage external-access function unit 970 and the function-selection-value generating unit 990 are connected to the internal bus 950.

Figures 10, 11:
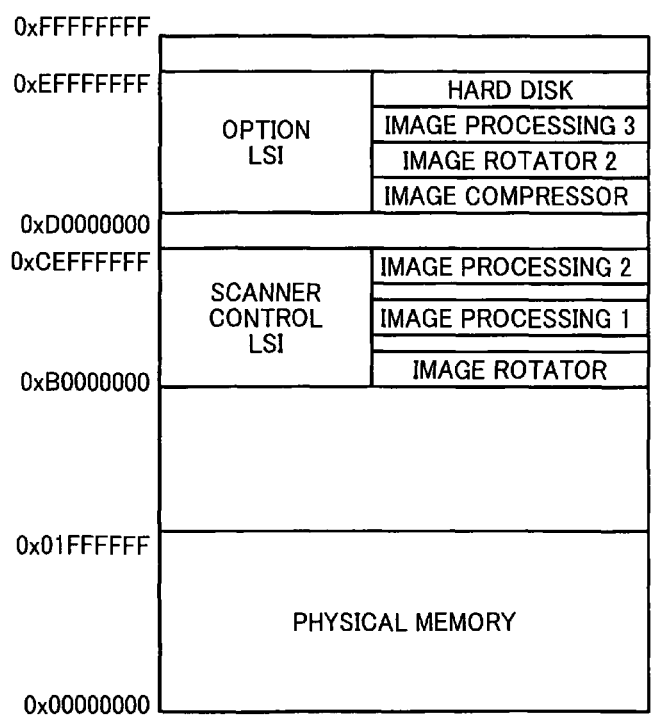
FIG. 10 is a diagram of the structure of a function association table in the option LSI.
FIG. 11 is a diagram of an example of an arrangement in an address space of register groups of the scanner control LSI and the option LSI.

The function selection decoder 980 decodes a function selection mode value input from the CPU memory bus 4 connected at a post stage and distributes operation permission signals to the respective function blocks. The function selection decoder 980 refers to a function correspondence table to generate the operation permission signals to the respective function blocks. FIG. 10 is an example of the function correspondence table of the function selection decoder 560. As shown in FIG. 10, functions are allocated to respective bits. In the example shown in FIG. 10, a 3rd bit is a missing number and four functions of 0th to 2nd and 4th bits can be selected to execute processing. In the example shown in FIG. 10, in the respective functions, '0' indicates that the functions are not executed (OFF) and '1' indicates that the functions are executed (ON).

As shown in FIG. 10, when the function selection mode value is '0', this indicates that all the functions of the image compressor 910, the second scanner-image post-processing unit 920, the second image rotator 930, and the hard disk controller 940 allocated to the 0th to 2nd and 4th bits are executed. When the function selection mode value is '1', this indicates that the functions of the image compressor 910, the second scanner-image post-processing unit 920, and the second image rotator 930 excluding the hard disk controller 940 are executed. In this embodiment, it is only selected with one function selection signal line whether all the four functions are activated or only the three functions are activated.

The function-selection-value generating unit 990 generates '1' as the function selection mode value and transmits the function selection mode value to the scanner control LSI 5. Consequently, the first scanner-image post-processing unit 520 and the first image rotator 530, which are the function blocks of the scanner control LSI 5, are inactivated and only the first scanner-image pre-processing unit 510 is activated. Therefore, image data subjected to only pre-processing is input to the option LSI 9. The option LSI 9 carries out post-processing and processing following the post-processing.

In this embodiment, the transmission control unit 30 transmits '0' as the function selection mode value regardless of whether the option LSI 9 is connected. Therefore, when the option LSI 9 is connected, '0' is input to the function selection decoder 980 as the function selection mode value. In the scanner control LSI 5, only when the option LSI 9 is not connected, '0' is input to the function selection decoder 560 as the function selection mode value. When the option LSI 9 is connected, '1' is input to the function selection decoder 560 of the scanner control LSI 5 as the function selection mode value. This makes it possible to change the functions executed in the respective LSIs. In other words, in the copying machine 100 according to this embodiment, because the transmission control unit 30 transmits the identical function selection mode value, it is possible to switch the functions executed in the respective LSIs without the necessity of recognizing the connected LSIs and the like.

A register group is arranged in an address space of the RAM 3 illustrated in FIG. 11 together with the scanner control LSI 5 and the option LSI 9. Registers of the respective functions in the LSIs are delimited in specific address units, for example, 0x1000. There is a function ID register shown in FIG. 12 at the top of the registers. This allows software to specify presence of a function by reading out a value of an ID.

Figure 13:
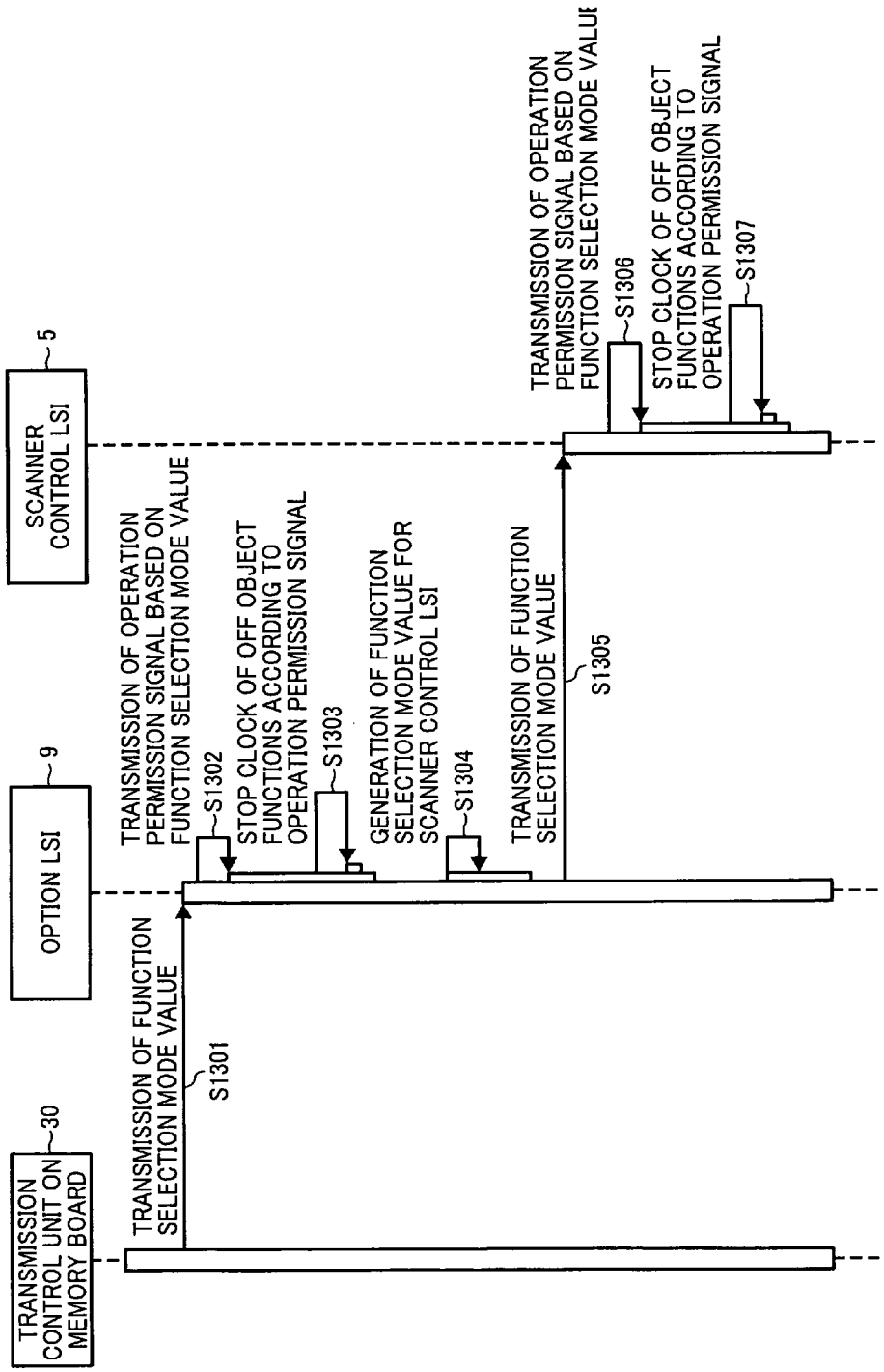
FIG. 13 is a sequence chart of processing from transmission of a function selection mode value to stop of functions of the respective LSIs in the multifunction product according to this embodiment.

Processing from transmission of a function selection mode value to stop of the respective functions in the copying machine 100 according to this embodiment configured as described above is explained. FIG. 13 is a sequence chart of a procedure of the processing in the copying machine 100 according to this embodiment. In this sequence chart, it is assumed that the option LSI 9 is connected to the connector unit 11.

The transmission control unit 30 on the board on the CPU memory bus 4 side transmits a function selection mode value '0' (Step S1301). Because the option LSI 9 is connected to the connector unit 11, the transmitted function selection mode value '0' is input to the option LSI 9 via the scanner I/F unit 20 and the connector unit 11. When the option LSI 9 is not connected to the connector unit 11, the transmitted function selection mode value '0' is input to the scanner control LSI 5.

When the function selection mode value '0' is input, the function selection decoder 980 of the option LSI 9 transmits operation permission signals to the respective function blocks based on the input function selection mode value '0' and the function correspondence table (Step S1302). The option LSI 9 stops clocks of execution stop (OFF) object functions among the functions for which the operation permission signals are input (Step S1303). In this processing procedure, there is no function, execution of which is stopped.

The function-selection-value generating unit 990 of the option LSI 9 generates a function selection mode value to be transmitted to the scanner control LSI 5 (Step S1304). In this processing procedure, '1' is generated as the function selection mode value.

The function-selection-value generating unit 990 transmits the function selection mode value '1' (Step S1305).

When the function selection mode value '1' is input, the function selection decoder 560 of the scanner control LSI 5 transmits operation permission signals to the respective function blocks based on the input function selection mode value '1' and the function correspondence table (Step S1306). The scanner control LSI 5 stops clocks of execution stop (OFF) object functions among the functions for which the operation permission signals are input (Step S1307). In this processing procedure, execution of the functions of the first scanner-image post-processing unit 520 and the first image rotator 530 is stopped.

According to the processing procedure, the transmission control unit 30 can appropriately set an active or inactive state of the respective functions between the option LSI 9 and the scanner control LSI 5 simply by transmitting a predetermined function selection mode value regardless of whether the option LSI 9 is connected. This makes it possible to facilitate extension of functions of data processing according to installation of extended devices and facilitate association among the extended devices.

In the copying machine 100 in which the respective units described above are configured, when the copying machine 100 has the basic configuration shown in FIG. 1, data signals of the scanner control LSI 5 and the CPU memory bus 4 are directly connected by using the connector unit 11 and the bypass board 12 as shown in FIG. 7. The function selection mode value '0' is input to the scanner control LSI 5. Therefore, all the functions of the scanner control LSI 5 are selected.

After a power supply is turned on, devices are initialized and an operating system is started. After the start of the operating system, the transmission control unit 30 transmits a function selection mode value.

After the processing for stopping the respective functions according to the transmission of the function selection mode value, software detects functions conforming to a flowchart shown in FIG. 14 and loads a software module corresponding to the functions. In this flowchart, first, software running on the CPU 1 reads out a new device ID from the device ID registers of the respective LSIs that provide the functions (Step S1401). When the copying machine 100 has the basic configuration, the software reads out a device ID of the scanner control LSI 5. When the copying machine 100 has the option configuration, after reading out a device ID of the option LSI 9, the software reads out the device ID of the scanner control LSI 5 as well via the option LSI 9.

The software running on the CPU 1 secures, on the RAM 3, an area in which a register address group of all functions of the device corresponding to the read-out apparatus ID (Step S1402).

The software reads out, for each of the functions indicated by function IDs, a register address group (the function ID register shown in FIG. 12) set in advance from the device corresponding to the device ID (Step S1403). In this embodiment, the software performs readout for each of functions allocated in a 0th bit to a 4th bit for each of device IDs. Concerning functions judged as active according to the function selection value, the software returns an appropriate readout value in response to a register access. However, concerning a function judged as inactive, the software returns a readout value "0" in response to the register access.

The software judges, concerning the read-out function, whether the readout value is "0" (Step S1404). When it is judged that the readout value is not "0" ("Yes" at Step S1404), the software shifts a control program corresponding to a function ID value from the ROM 2 onto the secured area of the RAM 3 and decompresses the control program (Step S1405). On the other hand, when it is judged that the readout value is "0" ("No" at Step S1404), the software proceeds to step S1406 without specifically performing processing.

The software repeats the processing from step S1403 for function IDs indicating all functions of the devices corresponding to the device IDs until the processing is completed.

The software judges whether all device IDs in the copying machine 100 have been read (Step S1407). When it is judged that all the device IDs have not been read ("No" at Step S1407), the software repeats the processing from step S1401 until all the device IDs are read. On the other hand, when it is judged that all the device IDs have been read ("Yes" at Step S1407), the software finishes the processing.

By performing the processing in this way, all the functions are selected, all the function IDs are read out, and a necessary software module is loaded.

Image data input from the scanner 7 is arranged on a memory (the RAM 3) via the register group 511 of the first scanner-image pre-processing unit 510, the register group 521 of the first scanner-image post-processing unit 520, the register group 531 of the first image rotator 530, the internal bus 540, and the external-access function unit 550 of the scanner control LSI 5 and the CPU memory bus 4. During printing, the plotter control LSI 6 outputs the image data arranged on the memory (the RAM 3) to the plotter.

The first image rotator 530 reads out the image data arranged on the memory (the RAM 3) using the read DMA controller 532 incorporated therein via the internal bus 540 and the external-access function unit 550. The first image rotator 530 writes a result obtained by subjecting the image data to rotation processing at a predetermined angle in the rotation processing block 535 on the memory (the RAM 3) using the write DMA controller 533.

When an option is mounted for the first time, the bypass board 12 is removed from the connector unit 11 and the option board 9a is inserted into the connector unit 11. When the option board 9a is inserted, the CPU memory bus 4 and the option LSI 9 are connected and the option LSI 9 and the scanner control LSI 5 are connected. In other words, the CPU memory bus 4, the option. LSI 9, and the scanner control LSI 5 are arranged in series.

When the copying machine 100 has the option configuration, two function selection mode values are output. One is a function selection mode value transmitted by the transmission control unit 30. The function selection mode value is output to the option LSI 9. The other is a function selection mode value generated by the function-selection-value generating unit 990 of the option LSI 9. The function selection mode value is a non-zero value and is output to the scanner control LSI 5. When the function selection mode value as the non-zero value is input to the scanner control LSI 5, in this embodiment, the first scanner-image post-processing unit 520 and the first image rotator 530 of the scanner control LSI 5 are inactivated. The inactivated function blocks return 0 in response to a register access when the register access is read and neglect the register access when the register access is write.

When the option board 9a is connected to the connector unit 11 in this way, the software attempts to read out a function ID of the first image rotator 530 according to the flowchart shown in FIG. 14 (steps S1403 and S1404). However, because "0" is read out, the software judges that the function is not present in the scanner control LSI 5 ("No" at step s1404) and does not load an application module corresponding to the function ("No" at step S1404 to step S1405). The same applies to the first scanner-image post-processing unit 520.

Consequently, the image input from the scanner 7 is input from the pre-stage external-access function unit 960 to the option LSI 9 through the first scanner-image pre-processing unit 510, the internal bus 540, and the external-access function unit 550 of the scanner control LSI 5. Data input to the option LSI 9 is written in the memory (the RAM 3) through the second scanner-image post-processing unit 920, the internal bus 950, the post-stage external-access function unit 970, and the CPU memory bus 4.

The first image rotator 530 and the second image rotator 930 are mounted on the scanner control LSI 5 and the option LSI 9, respectively. When the copying machine 100 has the option configuration, the option LSI 9 is closer to the memory (the RAM 3) and has relatively high access performance. Therefore, when an option is mounted, a rotation function of the first image rotator 530 of the scanner control LSI 5 is inactivated and the second image rotator 930 on the option side is used. The second image rotator 930 and the hard disk controller 940 of the option LSI 9 do not treat an image input from the pre-stage. The second image rotator 930 and the hard disk controller 940 process data read out from the memory (the RAM 3) and write the data in the memory (the RAM 3) again or input data in and output the data from the HDD 10.

A data transfer path among the scanner control LSI 5, the option LSI 9, and the CPU memory bus 4 or, if the bypass board 12 is used, a data transfer path among the scanner control LSI 5, the option LSI 9, the CPU memory bus 4, and the bypass board 12 is configured by, for example, a PCI-EXPRESS or a USB.

As described above, according to this embodiment, for example, there are effects described below.

When the option board 9a is connected and the functions are extended, it is possible to give a function selection mode value from the option LSI 9 to a data processing device at the pre-stage (in this embodiment, the scanner control LSI 5) and inactivate a part of the functions at the pre-stage. Therefore, it is possible to inactivate a function, which is made unnecessary by the installation of the option LSI (the extended device) 9, simply by connecting the option LSI (the extended device) 9.

The connection port 11a for the extended device is provided in the connector unit 11 in advance. Therefore, it is possible to easily extend a device without changing connection of existing devices.

A data path of the pre-stage devices is changed by function selection determined by connecting the option LSI (the extended device) 9. Therefore, it is possible to bypass data processing unnecessary for the option LSI 9.

The function selection signal given to the pre-stage can be changed by the software. Therefore, it is possible to dynamically change a data processing configuration.

When the post stage does not have an extended function, a signal for activating all the functions is input to the scanner control LSI 5 as the pre-stage device. Therefore, it is possible to automatically activate all the functions according to a connection state of the option LSI 9 without the intervention of software.

Only an operable function returns an active ID value in response to a read access for the function ID register from the software. The software can distinguish the ID value and load only necessary control software on the memory. Therefore, it is possible to save a memory amount.

In this embodiment, the scanner control LSI 5 and the option LSI 9 decode the function selection mode value indicated by "0" or "1" into operation permission signals. However, the function selection mode value is not limited to be decoded by the scanner control LSI 5 and the option LSI 9. A function selection mode value formed by a plurality of bits indicating whether the respective functions are executable can also be transmitted to the LSIs. For example, it is conceivable to transmit a function selection mode value formed by a plurality of bit strings to the scanner control LSI 5 and the option LSI 9 and allocate functions for executing processing common to the scanner control LSI 5 and the option LSI 9 to the respective bits of the function selection mode value. The functions and the like allocated to the respective bits are the same as those in the first embodiment. Therefore, explanation of the functions and the like is omitted.

In the explanation of this embodiment, the present invention is applied to the copying machine 100. However, the present invention can also be applied to any function control apparatus as long as a configuration for providing a new function (via a connector unit or the like) can be added between a configuration for providing a function (e.g., the scanner control LSI) and an interface (e.g., the scanner I/F unit) as described above.

In the example explained in the embodiment, only one connector unit 11 is provided between the scanner control LSI 5 and the scanner I/F unit 20. However, a plurality of connector units can also be provided to make it possible to connect a plurality of option boards.

According to an aspect of the present invention, extension of functions can be easily performed when the additional function control unit is connected. Further, information executed in one or both of the additional function control unit and the function control unit can be specified according to the function specifying information. Therefore, there is an effect that functions of the respective control units can be easily controlled.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A function control apparatus, comprising:
a transmission control unit to transmit function specifying information for specifying whether a function to be executed should be set to active or inactive;
a function control unit to execute a first function that is set to active according to the function specifying information;
a connecting unit operatively connecting the transmission control unit and the function control unit;
an additional function control unit to execute a second function that is set to active according to the function specifying information;
a central processing unit that is operatively connected to the function control unit and includes software; and
a memory onto which the software can be loaded;
wherein the additional function control unit is configured to be connected to and disconnected from the connecting unit,
wherein the first function that is set to active according to the function specifying information contains a common function common to the second function that is set to active according to the function specifying information,
wherein when the additional function control unit is connected to the connecting unit,
the transmission control unit transmits the function specifying information to the additional function control unit via the connecting unit,
the additional function control unit generates limited-function specifying information for setting, from active to inactive, the common function contained in the first function, and transmits the limited-function specifying information to the function control unit to thereby deactivate the common function contained in the first function, and
the software judges that the common function is not present in the function control unit when the function control unit receives the limited-function specifying information, and does not load an application module corresponding to the common function onto the memory, and
wherein when the additional function control unit is disconnected from the connecting unit, the transmission control unit transmits the function specifying information to the function control unit via the connecting unit.

2. The function control apparatus of claim 1, wherein upon receiving the limited-function specifying information, the function control unit executes a function other than the function that is set to inactive as the first function and processes data, and the additional function control unit executes the second function and applies a processing to the data processed by the function control unit.

3. The function control apparatus of claim 1, wherein when the additional function control unit is disconnected from the connecting unit, the connecting unit connects a wiring board in order to operatively connect the transmission control unit and the function control unit.

4. The function control apparatus of claim 1, wherein upon receiving the function specifying information from the transmission control unit, the function control unit executes all functions of the function control unit as the first function that is set to active according to the function specifying information.

5. The function control apparatus of claim 1, wherein the function control unit includes:
an identification-information storing unit that stores therein control-unit identification information for identifying the function control unit; and
a function control program that is specified based on the control-unit identification information and that controls the first function.

6. The function control apparatus of claim 1, wherein the additional function control unit includes:
an additional function control unit identification-information storing unit that stores therein control-unit identification information for identifying the additional function control unit; and an additional-function control program that is specified based on the control-unit identification information and that controls the second function.

7. A function control method, comprising:
transmitting function specifying information for specifying whether a function to be executed should be set to active or inactive;
executing a first function that is set to active according to the function specifying information;
executing a second function that is set to active according to the function specifying information; and
operatively connecting a unit to transmit the function specifying information and a unit to execute the first function that is set to active via a connecting unit;
wherein a unit to execute the second function that is set to active is configured to be connected to and disconnected from the connecting unit,
wherein the first function that is set to active according to the function specifying information contains a common function common to the second function that is set to active according to the function specifying information,
wherein when the unit to execute the second function is connected to the connecting unit,
the unit to transmit the function specifying information transmits the function specifying information to the unit to execute the second function via the connecting unit,
the unit to execute the second function generates limited-function specifying information for setting, from active to inactive, the common function contained in the first function, and transmits the limited-function specifying information to the unit to execute the first function that is set to active to thereby deactivate the common function contained in the first function, and
software of a central processing unit, operatively connected to the unit to execute the first function, judges that the common function is not present in the unit to execute the first function when the unit to execute the first function receives the limited-function specifying information, and does not load an application module corresponding to the common function onto a memory of the central processing unit, and wherein when the unit to execute the second function that is set to active is disconnected from the connecting unit, the unit to transmit the function specifying information transmits the function specifying information to the unit to execute the first function via the connecting unit.

8. The function control apparatus of claim 1, further comprising:
a bus operatively connected to the connecting unit.

9. The function control apparatus of claim 8, wherein the transmission control unit is operatively connected to the function control unit via the bus and the connecting unit.

10. The function control apparatus of claim 8, further comprising:
a random access memory (RAM) operatively connected to the bus.

11. The function control apparatus of claim 8, further comprising:
a read only memory (ROM) operatively connected to the bus.

12. The function control apparatus of claim 8, wherein the central processing unit (CPU) is operatively connected to the bus.

13. The function control apparatus of claim 1, wherein the function control unit includes a large-scale integration.

14. The function control apparatus of claim 13, wherein the large-scale integration is configured to control a scanner.

15. The function control apparatus of claim 1, wherein the additional function control unit includes a large-scale integration.

16. The function control apparatus of claim 15, wherein the large-scale integration is configured to control a scanner.

17. The function control apparatus of claim 1, further comprising:
a hard disk drive operatively connected to the additional function control unit.

18. The function control apparatus of claim 1, wherein the first function includes a scanner-image preprocessing function of performing image processing on scanner image data, and
wherein the second function includes a compression function of compressing the image data that has been subjected to the image processing.

* * * * *